Patented Dec. 31, 1940

2,226,534

UNITED STATES PATENT OFFICE 2,226,534

VULCANIZATION ACCELERATOR

Joy G. Lichty, Stow, Ohio, assignor to Wingfoot Corporation, Wilmington, Del., a corporation of Delaware No Drawing. Application April 24, 1937,
Serial No. 138,812

16 Claims. (Cl. 260—796)

This invention relates to the vulcanization of rubber. More particularly, it relates to the acceleration of the vulcanization of rubber by the use of the reaction products of aldehydes with amino hydroxy propanes.

It is disclosed in copending application Serial No. 102,249 filed September 23, 1936, that the amino hydroxy propanes, including certain substituted amino hydroxy propanes accelerate the vulcanization of rubber. The present invention resides in the discovery that, if these amino hydroxy propanes are reacted with aldehydes, products are formed which are also good vulcanization accelerators.

The amino hydroxy propanes employed in the practice of the invention may be prepared by reacting ammonia or certain amines with a halogen hydrin of propane corresponding to the product desired. For example, 1-amino-2, 3-dihydroxy propane may be prepared as follows:

A solution of 100 grams of 1-chloro-2, 3-dihydroxypropane and 40 grams of sodium hydroxide in 400 cc. of water and 1010 grams of 28% aqueous ammonium hydroxide was maintained at 15–20° C. for five hours. The excess of ammonia and the water were then removed by distillation under reduced pressure. The residue was treated with methyl alcohol and filtered to remove the sodium chloride. Distillation of the filtrate gave 52.3 grams of 1-amino-2, 3-dihydroxy propane boiling at 120–140° C. at two millimeters pressure. There was a 23 gram residue of condensed or polymerized material left from the distillation. Redistillation of the first mentioned fraction gave a product boiling at 125–128° C.

The other aminohydroxypropanes, such as diamino propanol (3), 2-amino-1, 3-dihydroxy propane, 1-amino 2-hydroxy propane, 1-amino 3-hydroxy propane, etc., may be similarly prepared by substituting the proper chlorhydrin or other halogen hydrin for the 1-chloro-2, 3-dihydroxy propane of the example.

Also, if desired, the ammonia of the example may be replaced by a primary aliphatic amine, which may be straight chain, branched chain, or cyclic, saturated or unsaturated, or aryl substituted, which aryl substitution group may be either carbocyclic or heterocyclic. Representative of these amines are methyl amine, ethyl amine, the propyl amines, the butyl amines, etc., the allyl amines, and other unsaturated primary aliphatic amines, benzyl amine, furfuryl amine, tetrahydro furfuryl amine, cyclohexyl amine, ring substituted cyclohexylamines, and the acetetrahydronaphthylamines. Also included are the the primary poly amines, such as ethylene diamine, the poly-ethylene polyamines, propylene diamine, cyclohexylene diamine, etc.

These amino hydroxy propanes react readily with aldehydes to yield condensation products.

The aldehydes used may be saturated or unsaturated; alkyl, aryl or aralkyl; carbocyclic or heterocyclic; etc. Aldols and other aldehyde condensation materials may also be employed.

Included among these materials are formaldehyde, heptaldehyde, propionaldehyde, beta hydroxy naphthaldehyde, acetaldehyde, butyraldehyde, crotonaldehyde, benzaldehyde, furfuraldehyde, aldol, alpha methyl beta ethyl acrolein, alpha ethyl beta propyl acrolein, etc.

Butyraldehyde may be reacted with 1-amino-2, 3-dihydroxy propane as follows:

Fifteen grams of butyraldehyde were added in small portions to 18.9 grams of 1-amino-2, 3-dihydroxy propane with stirring. The product was finally heated to 125° C. to remove the water. The yield was quantitative.

Similarly, butyraldehyde may be reacted with diamino propanol-2 as follows:

18.2 grams of butyraldehyde were added in small portions to 11.4 grams of diamino propanol-2 with stirring. The product was heated to 135° to remove the water. The yield was quantitative.

Any other aldehyde or any of the other amino propanols may be substituted for the substances of the preceding examples.

It will also be understood that it is not intended to limit the products to the proportions of reactants used in the examples. Since there are several ways in which the ingredients might react including condensation of the aldehyde with itself, the proportions may be varied within wide limits without exceeding the scope of the invention. For example, the proportion might be one mol of aldehyde to two mols of amines or one mol of amine to almost any excess of aldehyde. In the latter case, it may be desirable to remove the excess aldehyde from the product.

Also, it is not intended that the invention shall be limited to the pure substituted or unsubstituted amino propanols. It is pointed out in the aforementioned copending application No. 102,249, filed September 23, 1936, that in some instances it may be desirable to employ the relatively crude products of the reaction of the halogen hydroxy propanes with the ammonia or amine directly as an accelerator. Similarly, these unpurified products may also be reacted with aldehydes in the present invention.

The materials of the invention may be utilized as accelerators in most of the ordinary rubber formulae. The following is a specific formula in which they have been found by test to yield excellent results.

| | Parts by weight |
|---|---|
| Rubber (extracted pale crepe) | 100 |
| Zinc oxide | 5 |
| Sulfur | 3 |
| Stearic acid | 1.5 |
| Accelerator | 0.5 |

Representative materials of the invention were compounded with rubber in accordance with the above formula, subjected to vulcanization and tested.

The typical test data follow.

| Cure in mins. at °F. | Tensile strength, kgs./cm.² | Kgms./cm. 500% | Kgms./cm. 700% | Ult. elong., in percent |
|---|---|---|---|---|
| Condensate of butyraldehyde with 1-amino-2, 3-dihydroxy propane | | | | |
| 40/285 | 94 | 13 | 37 | 800 |
| 60 | 116 | 16 | 51 | 840 |
| 80 | 138 | 17 | 57 | 850 |
| 120 | 100 | 11 | 30 | 925 |
| Condensate of butyraldehyde with diamino propanol-2 | | | | |
| 20/260 | 68 | 10 | 24 | 925 |
| 40 | 104 | 13 | 38 | 890 |
| 60 | 138 | 15 | 52 | 870 |
| 80 | 146 | 20 | 74 | 815 |

From these data, it is seen that the materials possess very good accelerating properties.

Although only the preferred embodiment of the invention has been described in detail, it will be apparent to those skilled in the art that various modifications may be made therein without departing from the spirit of the invention or the scope of the appended claims. It is intended that the patent shall cover, by suitable expression in the appended claims, whatever features of patentable novelty reside in the invention.

What I claim is:

1. The method of treating rubber which comprises vulcanizing the rubber in the presence of an aldehyde derivative of a primary amino hydroxy propane.

2. The method of treating rubber which comprises vulcanizing the rubber in the presence of an aldehyde derivative of a di (primary amino) hydroxy propane.

3. The method of treating rubber which comprises vulcanizing the rubber in the presence of an aldehyde derivative of a primary amino dihydroxy propane.

4. The method of treating rubber which comprises vulcanizing the rubber in the presence of the reaction product of an aliphatic aldehyde and a primary amino hydroxy propane.

5. The method of treating rubber which comprises vulcanizing the rubber in the presence of the reaction product of an aromatic aldehyde and a primary amino hydroxy propane.

6. The method of treating rubber which comprises vulcanizing the rubber in the presence of the reaction product of butyraldehyde and 1-amino-2, 3-dihydroxy propane.

7. The method of treating rubber which comprises vulcanizing the rubber in the presence of the reaction product of butyraldehyde and diamino propanol-2.

8. A rubber product which has been vulcanized in the presence of an aldehyde derivative of a primary amino hydroxy propane.

9. A rubber product which has been vulcanized in the presence of an aldehyde derivative of a di-(primary amino) hydroxy propane.

10. A rubber product which has been vulcanized in the presence of an aldehyde derivative of a primary amino dihydroxy propane.

11. The method of treating rubber which comprises vulcanizing it in the presence of an aldehyde derivative of an amino hydroxy propane in which the amino radicals are selected from the group consisting of primary amino radicals and secondary aliphatic amino radicals.

12. A rubber product which has been vulcanized in the presence of an aldehyde derivative of an amino hydroxy propane in which the amino radicals are selected from the group consisting of primary amino radicals and secondary aliphatic amino radicals.

13. A rubber product which has been vulcanized in the presence of the reaction product of an aliphatic aldehyde and a primary amino hydroxy propane.

14. A rubber product which has been vulcanized in the presence of the reaction product of an aromatic aldehyde and a primary amino hydroxy propane.

15. A rubber product which has been vulcanized in the presence of the reaction product of butyraldehyde and 1-amino-2, 3-dihydroxy propane.

16. A rubber product which has been vulcanized in the presence of the reaction product of butyraldehyde and diamino propanol-2.

JOY G. LICHTY.